United States Patent [19]

Bales et al.

[11] Patent Number: 5,544,237
[45] Date of Patent: Aug. 6, 1996

[54] AUTOMATIC CONFERENCE INITIATION UPON ALL TELEPHONES FOR THE CONFERENCE BEING IDLE

[75] Inventors: Bruce M. Bales, Louisville; Stephen M. Thieler, Boulder, both of Colo.

[73] Assignee: AT&T Corp., Murray Hill, N.J.

[21] Appl. No.: 362,678

[22] Filed: Dec. 22, 1994

[51] Int. Cl.$^6$ ............................................. H04M 3/56
[52] U.S. Cl. ........................... 379/205; 379/202; 379/204; 379/201; 379/209
[58] Field of Search .................................. 379/201, 202, 379/203, 204, 205, 206, 209; 370/62, 68.1, 110.1

[56] References Cited

U.S. PATENT DOCUMENTS

| | | | |
|---|---|---|---|
| 4,132,860 | 1/1979 | Rasmussen | 379/163 |
| 4,359,603 | 11/1982 | Heaton | 379/62 |
| 4,436,963 | 3/1984 | Cottrell et al. | 379/211 |
| 4,546,468 | 10/1985 | Christmas et al. | 370/54 |
| 4,577,065 | 3/1986 | Frey et al. | 379/204 |
| 4,635,251 | 1/1987 | Stanley et al. | 370/62 |
| 4,653,090 | 3/1987 | Hayden | 379/204 |
| 4,790,004 | 12/1988 | Nolbone | 370/214 |
| 4,796,293 | 1/1989 | Blinken et al. | 379/202 |
| 5,182,750 | 1/1993 | Bales et al. | 370/110.1 |
| 5,195,086 | 3/1993 | Baumgartner et al. | 370/62 |
| 5,212,726 | 5/1993 | Dayner et al. | 379/202 |
| 5,369,694 | 11/1994 | Bales et al. | 379/206 |
| 5,373,549 | 12/1994 | Bales et al. | 379/93 |
| 5,425,091 | 6/1995 | Josephs | 379/201 |

*Primary Examiner*—Jeffery A. Hofsass
*Assistant Examiner*—Daniel S. Hunter
*Attorney, Agent, or Firm*—John C. Moran

[57] ABSTRACT

Telephone terminals provide an initiate conference feature. In response to actuation of a button, as each telephone terminal is dialed, a logical link is set up between an initiating telephone terminal and the dialed telephone terminal. Once all the terminals of the conference call are communicating with the initiating telephone terminal via logical links, the initiating telephone terminal waits until all of the other terminals are idle and then sets up a conference call that has the appropriate bandwidth for the type of conference call requested. Once a logical link has been set up to a telephone terminal, that telephone terminal lights the indicator associated with the initiate conference feature. A telephone terminal whose initiate conference indicator is lit can remove itself from the proposed conference by its own initiate conference button being actuated. Further, if two telephone terminals are engaged in a telephone call and a third telephone terminal is to be added to the call, the user of a first telephone terminal actuates the initiate conference button and dials the third telephone terminal. Once a logical link has been established to this third party, the user of the first telephone terminal rejoins the user of the second telephone terminal in the original telephone call. When the first telephone terminal detects that the third telephone terminal is idle via the logical link, a conference call is established between the three telephone terminals.

26 Claims, 5 Drawing Sheets

| CONFERENCE TABLE | |
|---|---|
| ID | ADDRESS |
| 0 | 101* |
| 1 | 102 |
| 2 | 103 |
| 3 | 104 |

5,544,237

AUTOMATIC CONFERENCE INITIATION UPON ALL TELEPHONES FOR THE CONFERENCE BEING IDLE

TECHNICAL FIELD

This invention relates to telecommunication conference calls and, in particular, to the establishment of a telecommunication conference call.

BACKGROUND OF THE INVENTION

In prior art business communication switching systems (also referred to as PBXs), conference calls suffer from a major problem. This problem is trying to set up the conference call at a time when all of the telephone station sets are idle. If two individuals are talking on a telephone call and wish to add a third person, one of the individuals actuates a conference button on their station set and upon receiving dial tone, dials the third party. If the third party is idle, the third party answers; and then, the dialing party actuates the conference button a second time to bring all three individuals into a conference call. The problem arises when the third person is busy, and it is necessary to periodically try to establish a conference with that third person. This is not only frustrating for the two individuals engaged in the telephone call, but also can be expensive if the type of call is a video call between the first two individuals. It is also expensive since useful conversation does not occur until the third person is added. A similar situation arises where a conference call is to be set up among a number of station sets. A great deal of time can be wasted for many people if one or two of the individuals of the proposed conference are busy on their telephones while the conference call is being set up. Once again, the costs becomes important if it is a video conference call.

Within prior art business communication switching systems, a meet-me conference call can overcome some of the difficulties described in the previous paragraph. A meet-me conference call is set up by each of the individuals dialing a conferencing bridge such as that provided by the Alliance dedicated teleconferencing service from AT&T. The meet-me conference does not solve the problem when a conference is being set up that was not prearranged. Even in a prearranged conference, time and money can be wasted while members of the conference wait for one or two conference members to dial into the conferencing bridge.

SUMMARY OF THE INVENTION

The foregoing problems are solved and a technical advance is achieved by telephone terminals that provide an initiate conference feature. In response to actuation of a button, as each telephone terminal is dialed, a logical link is set up between an initiating telephone terminal and the dialed telephone terminal. Once all the terminals of the conference call are communicating with the initiating telephone terminal via logical links, the initiating telephone terminal waits until all of the other terminals are idle and then sets up a conference call that has the appropriate bandwidth for the type of conference call requested. Advantageously, once a logical link has been set up to a telephone terminal, that telephone terminal lights the indicator associated with the initiate conference feature. A telephone terminal whose initiate conference indicator is lit can remove itself from the proposed conference by its own initiate conference button being actuated.

Further, if two telephone terminals are engaged in a telephone call and a third telephone terminal is to be added to the call, the user of a first telephone terminal actuates the initiate conference button and dials the third telephone terminal. Once a logical link has been established to this third party, the user of the first telephone terminal rejoins the user of the second telephone terminal in the original telephone call. When the first telephone terminal detects that the third telephone terminal is idle via the logical link, a conference call is established between the three telephone terminals.

DETAILED DESCRIPTION

Figures 1, 4:
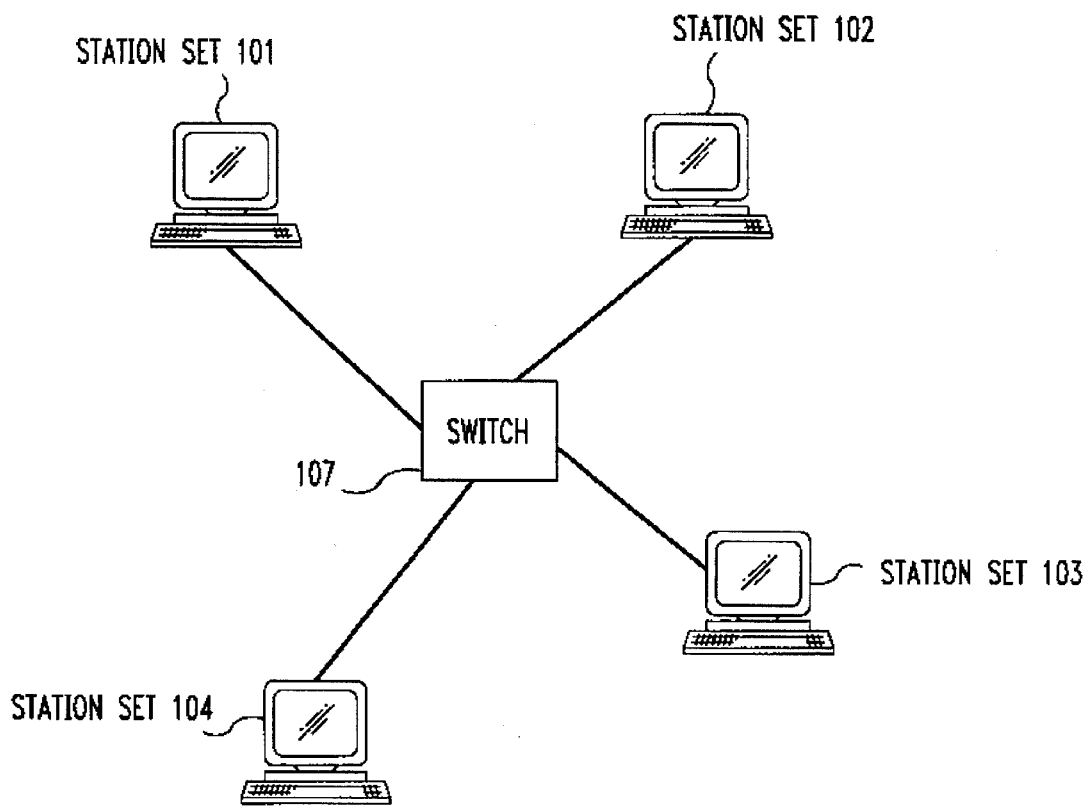
FIG. 1 illustrates a system embodying the inventive concept.
FIG. 4 illustrates a table that is used in the operations illustrated in FIGS. 2 and 3.

FIG. 1 illustrates a plurality of station sets (also referred to as telephone terminals) interconnected by switch 107. Advantageously, switch 107 can be a plurality of switches and indeed can be the continental or intercontinental long distance switching system. The basic operation of station sets 101 through 104 and switch 107 are described in further detail in a U.S. patent application entitled "Automatic Initialization of a Distributed telecommunication System", Ser. No. 07/816360, filed Dec. 30, 1991, and assigned to same assignee as the present patent application. This patent application is now U.S. Pat. No. 5,386,466. This patent application is hereby incorporated by reference. The stations sets implement a conventional OSI model modified to implement the ISDN protocol. Switch 107 is capable of switching ISDN messages and calls. As set forth in the above-incorporated patent application, certain modifications have been made to the standard OSI model in order to include ISDN capabilities. Within the software model, there are eight software layers, each of these layers is described in detail in the above-referenced patent. (Note that the OSI model is also designated as having seven layers where the highest layer combines seven and eight of the description in the present application.) The present application is presented in terms of the highest software layer, the applications layer, and assumes the detail set forth in the above-incorporated patent application. In addition, the functions performed by the remaining software layers, such as system initiation, called routing, and message transmission, are also set forth with respect to the above-incorporated patent application.

The present invention is described by way of two examples. In the first example, station set 101 and station set 102 are engaged in a telephone conversation via switch 107. When it is desired that station set 104 become part of a conference that will consist of station sets 101, 102, and 104, the user of station set 101 actuates the initiate conference button. The user of station set 101 then dials the number of station set 104. If station set 104 is idle, station set 101 and 104 are connected in a telephone conversation, and a conference is established by adding station set 102. If station set 104 is busy, station set 101 is notified, and station set 101 displays an audible or visual message to the user of station set 101 that the initiate conference feature has been activated. A logical link is established between station sets 101 and 104. The logical link can be set up using a user-user temporary signalling connection or it may be set up by utilizing a logical link in the D channels that connect both station sets to switch 107. This type of logical link is described in U.S. Pat. No. 5,182,750 which is hereby incorporated by reference. After the message is displayed, station set 101 rejoins station set 102 in the original telephone call. When station set 104 becomes idle, it transmits this fact via the logical link to station set 101. In response, station set 101 establishes a conference call that includes station sets 101, 102, and 104. While the conference call is waiting to be set up, an indicator associated with the initiate conference button on both station sets 101 and 104 is lit. The initiation of the conference call can be terminated by the user of 104 actuating the initiate conference button. User of station set 101 terminates the initiation of the conference call by hanging up.

Consider now the second example. The user of station set 101 wishes to establish a conference call with station sets 102, 103, and 104. The user of station set 101 first starts the call origination procedure, actuates the initiate conference button, and dials each of the other station sets. The call origination procedure may be going offhook. As each of the other station sets is dialed, a logical link is set up to that station set and station set 101. After all station sets have been dialed, the user of station set 101 goes on-hook. In each of the station sets, the indicator associated with the initiate conference button is lit. The users of any of the station sets can avoid being part of the conference call by actuating the initiate conference button. Station sets 102, 103, and 104 transmit their idle/busy state to station set 101. When all of the station sets are idle, station set 101 sets up the conference call.

Figure 2:
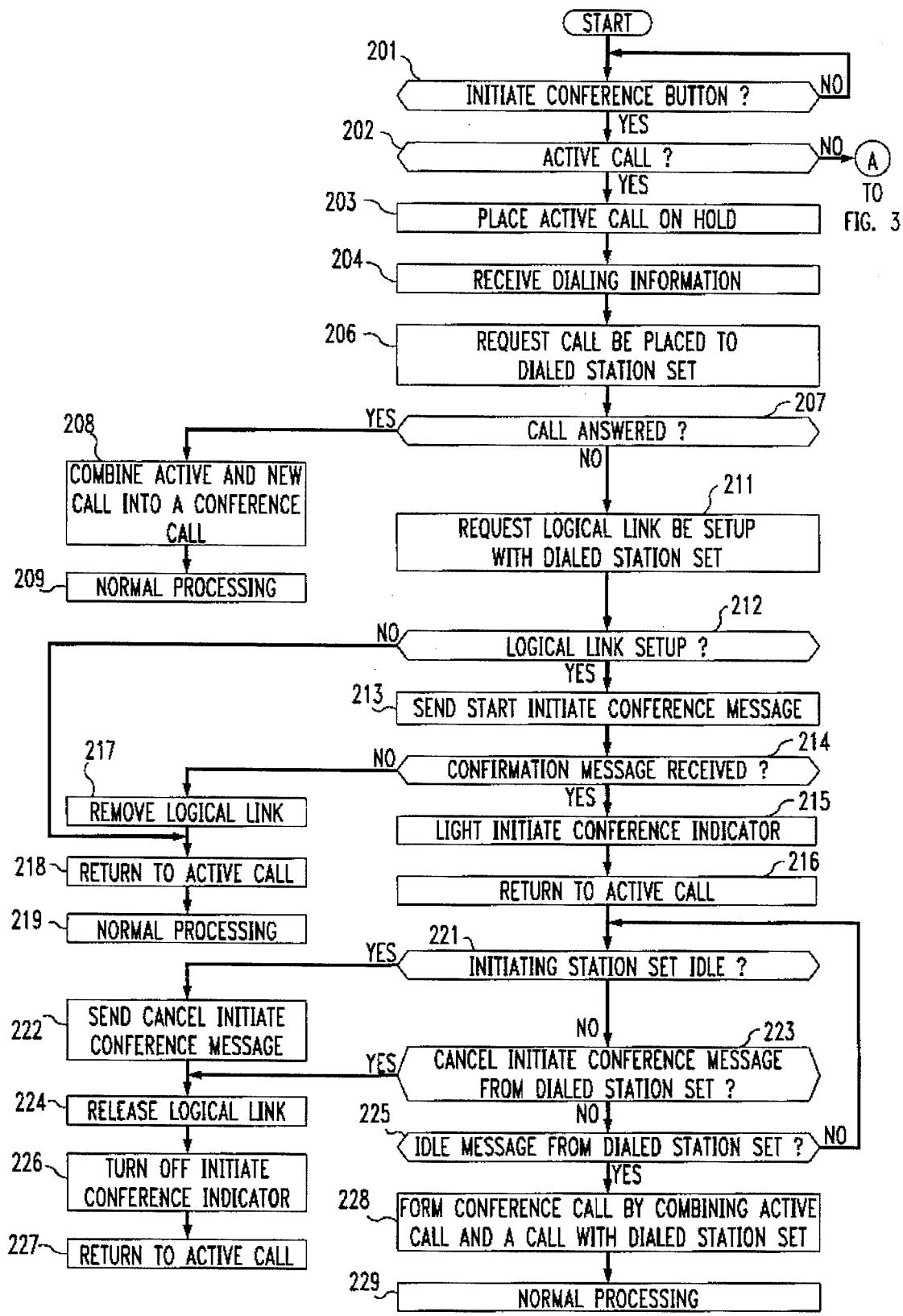
FIGS. 2 and 3 illustrate, in flow chart form, the operations performed by a station set that has initiated the conference feature.
Figure 3:
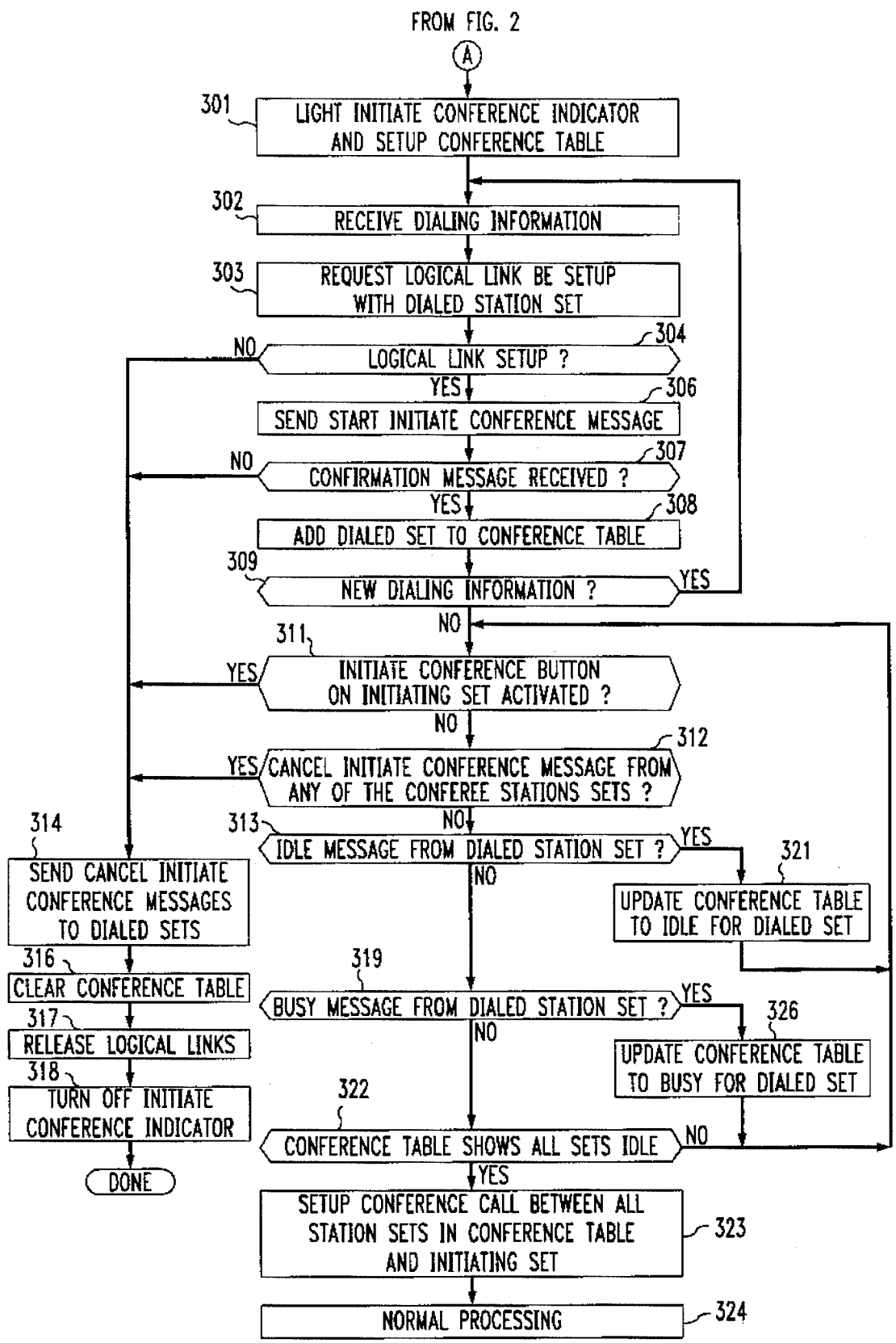
Figure 5:
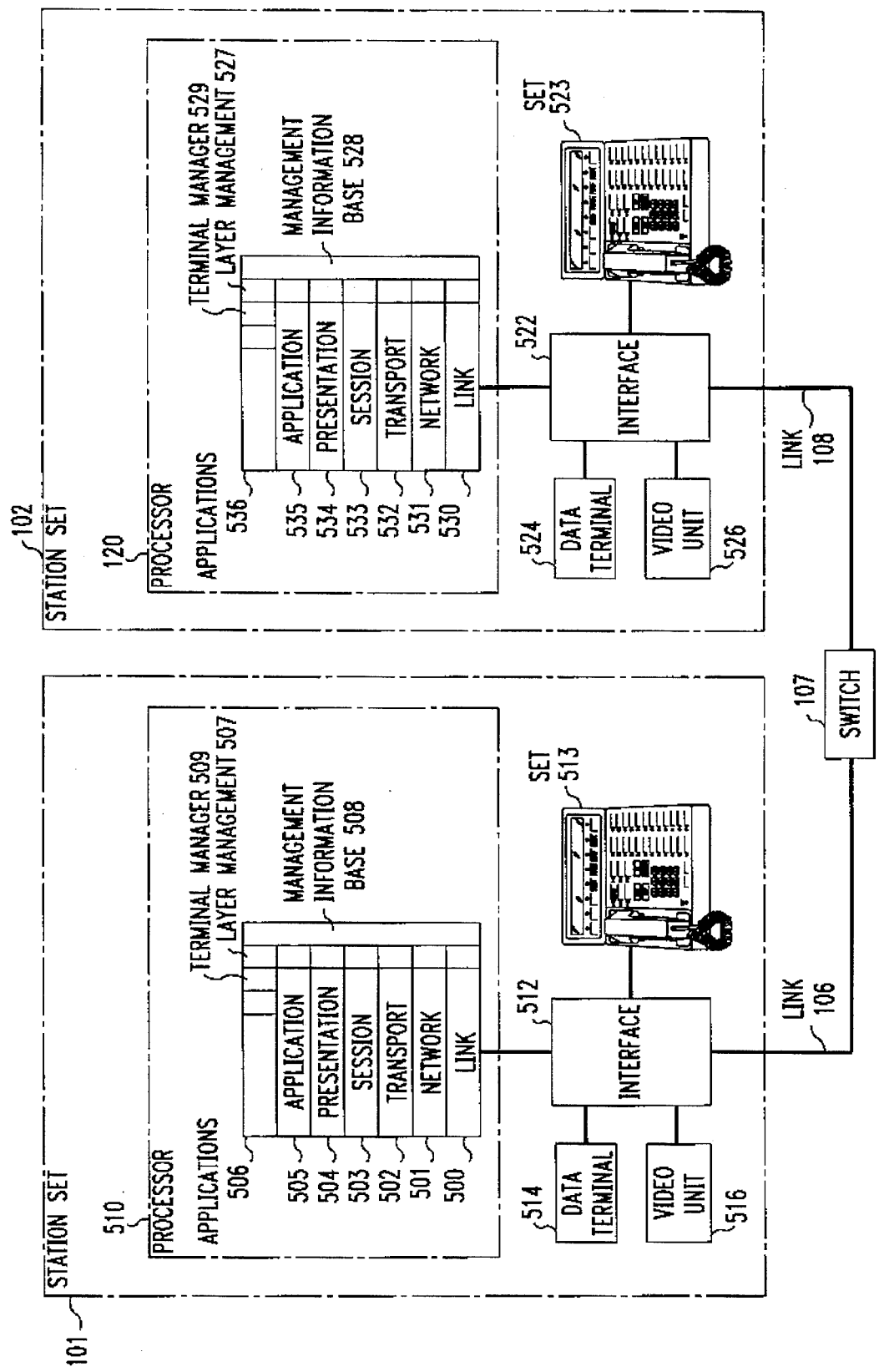
FIG. 5 illustrates in greater detail two stations sets.

FIG. 5 illustrates a block diagram view of station sets 102 and 101 interconnected by switch 107. Station sets 103 and 104 have a similar structure. FIGS. 2 and 3 illustrate the operations performed by processor 510 (FIG. 5) of station set 101 in implementing the two previous examples. The conference table maintained by processor 510 is illustrated in FIG. 4.

The station set initiating the initiate conference, which in the previous example was station set 101, first executes decision block 201 of FIG. 2 which tests to see if an initiate conference button has been actuated. If the answer is yes, decision block 202 determines if the initiating station set is presently active on a call. If the answer is yes, this means that the user of the initiating station set wishes to conference into the active call another station set. If the answer is yes in decision block 202, the active call is placed on hold by execution of block 203, and block 204 receives the dialing information for the new station set. Block 206 requests that a call be placed to the dialed station set. Decision block 207 checks to see whether the call was answered. If the answer is yes, control is transferred to block 208 which combines the active and the newly set up call into a conference call and transfers control to block 209 for normal processing.

Returning to decision block 207, if the answer is no, block 211 is executed to request that a logical link is set up with the terminal manager application of the dialed logical station set. Decision block 212 then checks to see if the logical link has been set up. If the answer is no, control is transferred to blocks 218 and 219 which return the initiating station set back to the active call for normal processing. Returning to decision block 212, if the answer is yes, block 213 sends an initiate conference message to the dialed station set. Decision block 214 then waits for a confirmation message. If the confirmation message is not received, block 217 is executed which removes the logical link and transfers control to block 218. If the confirmation message is received in decision block 214, control is transferred to block 215 which lights the initiate conference indicator. Next, block 216 returns the initiating station set to the active call.

After execution of block 216, blocks 221–229 wait for the dialed station set to become idle so that a conference call can be formed or for conditions to arise wherein the initiate conference feature is abandoned. First, decision block 221 checks to see if the initiating station set is idle. If the answer is yes, control is transferred to block 222 which sends a cancel initiate conference message to the dialed station set. Block 224 then releases the logical link, and block 226 turns off the initiate conference indicator. Finally, block 227 returns to the active call that will be abandoned since the initiating station set is now idle.

Returning to decision block 221, if the initiating station set is not idle, decision block 223 checks if a cancel initiate conference message was received from the dialed station set. If the answer is yes in decision block 223, control is transferred to block 224. If the answer is no in decision block 223, control is transferred to decision block 225 which checks if an idle message was received from the dialed station set. If the answer is no, control is returned to decision block 221. If the answer is yes in decision block 225, control is transferred to block 228 which forms the conference call by combining the active call and a call with the dialed station set. Block 228 also sends a call being set up message to the dialed station set and then releases the logical link. After execution of block 228, block 229 is executed for normal processing.

Returning to decision block 202. If the answer is no, this means that the user of the initiating station set is initiating a conference which starts when all of the designated conference station sets are idle. Decision block 202 transfers control to block 301 of FIG. 3 when the answer is no in decision block 202. Block 301 lights the initiate conference indicator on the initiating station set and sets up the conference table illustrated in FIG. 4. Block 302 then receives the dialing information from the initiating station set, and block 303 requests that a logical link be set up with the dialed station set. Decision block 304 checks to see if a logical link has been set up with the dialed station set. If the answer is no, control is transferred to blocks 314–318 which abandon the initiate conference feature. If the answer in decision block 304 is yes, control is transferred to block 306 which sends a start initiate conference message to the dialed station set. Decision block 307 checks for a confirmation message in response to the start initiate conference message. If the answer is no, control is transferred to block 314. If the answer is yes, control is transferred to block 308 which adds the dialed set to the conference table. Decision block 309 then checks to see if the user of the initiating station set is dialing another station set. If the answer is yes, control is transferred back to block 302. If the answer is no, control is transferred to decision block 311.

Blocks 311–313, 319, and 321–326 determine when the designated station sets in the conference table are idle so that the conference may be started or that the initiate conference feature be abandoned. Decision block 311 detects to see if the initiate conference button on the initiating station set has been actuated. If the answer is yes, this means that the initiate conference feature is to be abandoned and control is transferred to 314. If the answer is no in decision block 311, control is transferred to decision block 312 which checks to see if a cancel initiate conference message has been received from any of the conferee station sets. If the answer is yes, the initiate conference feature is abandoned by transferring control to decision block 314. One skilled in the art could readily envision that the failure to establish a logical link or one conference station sending a cancel initiate conference message would not terminate the feature. If the answer in decision block 312 is no, control is transferred to decision block 313. The latter decision block checks to see if an idle message has been received from one of the dialed station sets. If the answer is yes, the conference table is updated with respect to that dialed set by marking it idle by execution of block 321. After execution of block 321, control is transferred back to decision block 311.

Returning to decision block 313, if the answer is no, control is transferred to decision block 319 which checks if a busy message was received from a dialed station set. If the answer is yes, the conference table is updated to show that the dialed station set is busy by execution of block 326. After execution of block 326, control is returned to block 311. If the answer in decision block 319 is no, decision block 322 is executed which checks the conference table to determine if all of the sets are idle. If the answer is no, control is transferred back to decision block 311. If the answer is yes in decision block 322, control is transferred to blocks 323 and 324 which set up the conference call and then perform normal conference call processing.

Figure 6:
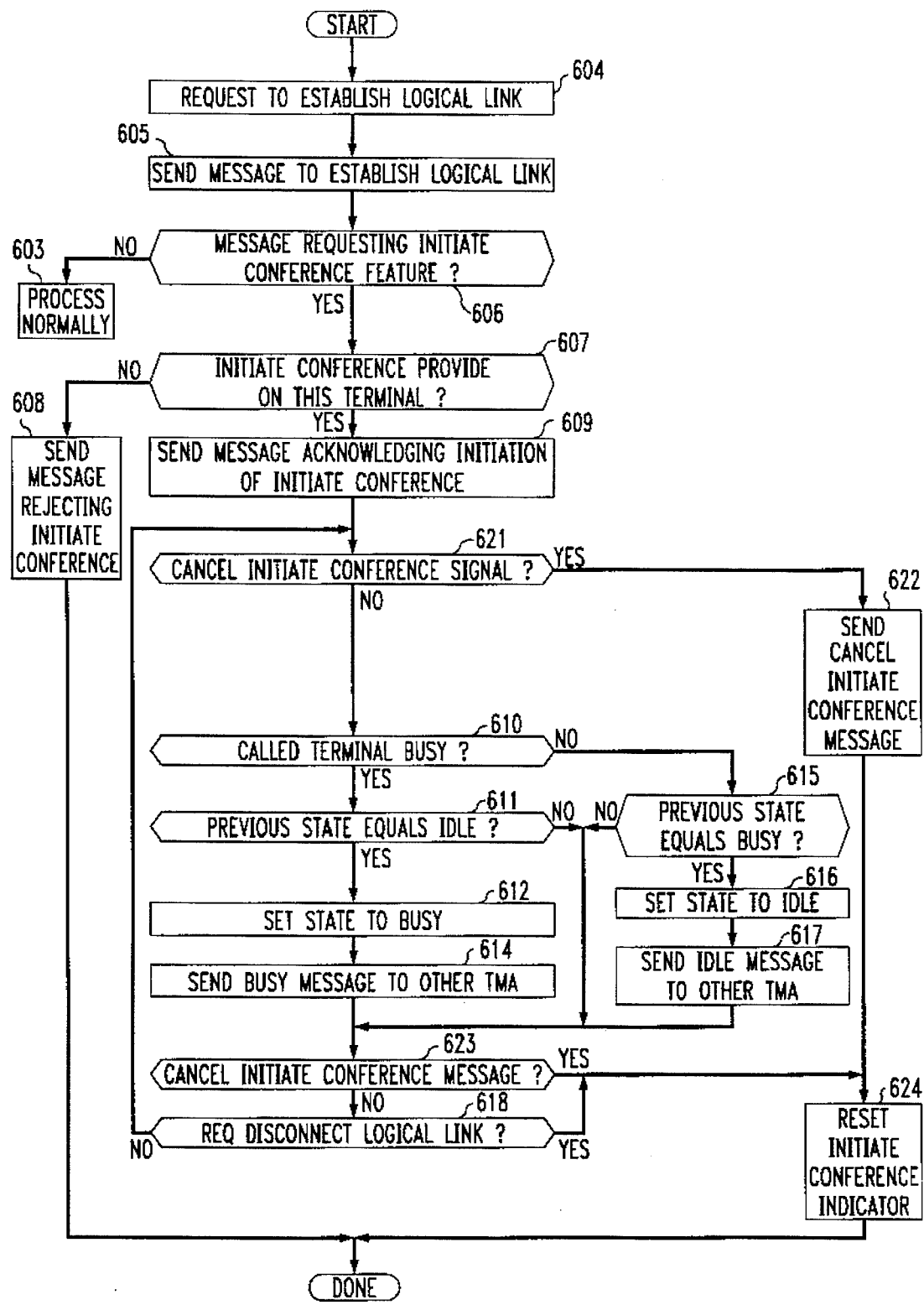
FIG. 6 illustrates the operations, in flow chart form, performed by a station set that is to become part of a conference.

FIG. 6 illustrates, in flow chart form, the operations performed by a dialed station set in providing the initiate conference feature. In accordance with the present example, these dialed station sets are station sets 102, 103, and 104. For purposes of description, the dialed station set is described as station set 102. The operations are performed by terminal manager application 529 of FIG. 5. Terminal manager application works in conjunction with software layers 530–535. Block 604 waits for a message from the originating station set, station set 101, requesting the establishment of a logical link. When block 604 receives the message, control is transferred to block 605 which sends a message establishing the logical link back to terminal management 509 of station set 101 of FIG. 5. Control is then transferred to decision block 606 which awaits a message requesting the initiation of the initiate conference feature. If this message is not received, control is transferred to block 603. If the request is received, control is transferred to decision block 607 which determines if the initiate conference feature is provided on this station set. If the answer to decision block 607 is no, block 608 is executed which sends a message rejecting the request for initiation of the initiate conference feature. If the answer in decision block 607 is yes, control is transferred to block 609 which sends a message back to terminal management application 509 of station set 101 acknowledging the initiation of the initiate conference feature. Further, block 609 turns on the indicator light associated with the initiate conference button on set 523 of FIG. 5.

From block 609, control is transferred to decision block 621 which checks if the initiate conference button has been actuated. The user of station set 102 actuates the initiate conference button to terminate the initiate conference feature. If the answer in decision block 621 is yes, block 622 sends a cancel initiate conference message to terminal management application 509 and passes control to block 624. The latter block resets the indicator light associated with the initiate conference button on set 523.

If the answer in decision block 621 is no, control is transferred to decision block 610. The latter decision block determines if station set 102 is busy. If the answer is yes, decision block 611 determines if the state has been set equal to idle. If the state has been set equal to idle, control is transferred to block 612 which sets the state to busy, and block 614 sends a busy message to terminal management application 509 of communication station set 101. For this example, terminal management application 509 is the other terminal management application. After execution of block 614, control is transferred to decision block 623. Decision block 623 tests if a cancel initiate conference message has been received from terminal management application 509. If the answer is no, control is transferred to decision block 618. If the answer is yes, control is transferred to block 624. Returning to decision block 611, if the answer is no, control is transferred to decision block 623.

Returning to decision block 610, if the station set is idle, control is transferred to decision block 615 which determines if the state has been set equal to busy. If the answer is yes, block 616 sets the state to idle, and block 617 transmits an idle message to terminal management application 509. From block 617, control is transferred to decision block 623. Returning to decision block 615, if the answer is no, control is transferred to decision block 623. Decision block 618 checks if a request to disconnect logical link message has been received from terminal management application 509. If the answer is yes, control is transferred to block 624. If the answer in decision block 618 is no, control is transferred to 621.

It is to be understood that the above-described embodiment merely is illustrative of the principles of the invention and that arrangements may be devised by those skilled in the art without departing from the spirit and scope of the invention.

We claim:

1. A method for forming a conference call upon on all station sets party to the conference call being idle, comprising the steps of:

establishing logical links between designated station sets and a station set that is initiating the conference call by the initiating station set;

receiving first messages by the initiating station set via the logical links from each of the designated station sets where the first message defines when the sending designated station set is idle;

controlling setting up the conference call by the initiating station set upon all of the designated station sets and initiating station set being idle.

2. The method of claim 1 further comprises the step of terminating the initiation of the conference call by the initiating station set in response to receipt of a second message from one of the designated station sets.

3. The method of claim 2 further comprises the step of transmitting the second message by the one of the designated station sets in response to an action by a user of the one of the designated station sets.

4. The method of claim 2 wherein the step of terminating comprises the step of transmitting by the initiating station set via the logical links a third message to each of the other designated station sets informing the other designated station sets that the initiation of the conference call has been terminated.

5. The method of claim 2 further comprises the step of terminating the initiation of the conference call in response to an action of a user of the initiating station set requesting the termination.

6. The method of claim 5 wherein the initiating station set and the designated station sets are interconnected by a telecommunication switching system that is responsive to ISDN signaling and the step of establishing further comprises the step of using user-user temporary signaling to establish the logical links via the telecommunication switching system.

7. The method of claim 5 wherein the initiating station set and the designated station sets are interconnected by a telecommunication switching system that is responsive to ISDN signaling and the step of establishing further comprises the step of using logical links in D channels to establish the logical links via the telecommunication switching system.

8. A method for initiating a three-way conference call during a call between an initiating station set and a second station set, comprising the steps of:

establishing a logical link to a first station set from the initiating station set by the initiating station set upon a three-way conference call to the first station set being unanswered;

returning to the call with the second station set; and automatically controlling setting up a three-way conference call with the first station set, second station set and initiating station set by the initiating station set upon receipt of a first message via the logical link from the first station set defining that the first station set is idle.

9. The method of claim 8 further comprises the step of receiving a second message from the first station set via the logical link upon the first station set being busy.

10. The method of claim 9 further comprises the step of terminating the initiation of the three-way conference call upon a receipt of a third message from the first station set.

11. The method of claim 10 comprises the step of transmitting the third message by the first station set in response to an action of a user of the first station set.

12. The method of claim 10 wherein the initiating station set and the first station set are interconnected by a telecommunication switching system that is responsive to ISDN signaling and the step of establishing further comprises the step of using user-user temporary signaling to establish the logical link via the telecommunication switching system.

13. The method of claim 10 wherein the initiating station set and the first station set are interconnected by a telecommunication switching system that is responsive to ISDN signaling and the step of establishing further comprises the step of using a logical link in a D channel to establish the logical link via the telecommunication switching system.

14. An apparatus for forming a conference call upon on all station sets party to the conference call being idle, comprising:

means for establishing logical links between designated station sets and a station set that is initiating the conference call by the initiating station set;

means for receiving first messages by the initiating station set via the logical links by the initiating station set from each of the designated station sets where the first message defines when the sending designated station set is idle;

means for controlling setting up the conference call by the initiating station set upon all of the designated station sets and initiating station set being idle.

15. The apparatus of claim 14 further comprises means for terminating the initiation of the conference call by the initiating station set in response to receipt of a second message from one of the designated station sets.

16. The apparatus of claim 15 further comprises means for transmitting the second message by the one of the designated station sets in response to an action by a user of the one of the designated station sets.

17. The apparatus of claim 15 wherein the means for terminating comprises means for transmitting by the initiating station set via the logical links a third message to each of the other designated station sets informing the other designated station sets that the initiation of the conference call has been terminated.

18. The apparatus of claim 15 further comprises means for terminating the initiation of the conference call in response to an action of a user of the initiating station set requesting the termination.

19. The apparatus of claim 18 wherein the initiating station set and the designated station sets are interconnected by a telecommunication switching system that is responsive to ISDN signaling and the means for establishing further comprises means for using user-user temporary signaling to establish the logical links via the telecommunication switching system.

20. The apparatus of claim 18 wherein the initiating station set and the designated station sets are interconnected by a telecommunication switching system that is responsive to ISDN signaling and the means for establishing further comprises means for using logical links in D channels to establish the logical links via the telecommunication switching system.

21. An apparatus for forming a three-way conference call during a call between an initiating station set and a second station set, comprising:

means for establishing a logical link to a first station set by the initiating station set upon a three-way conference call to the first station set being unanswered;

means for returning to the call with the second station set; and means in the initiating station set for automatically controlling setting up a three-way conference call with the first station set, second station set and initiating station set upon receipt of a first message via the logical link from the first station set defining that the first station set is idle.

22. The apparatus of claim 21 further comprises means for receiving a second message from the first station set via the logical link upon the first station set being busy.

23. The apparatus of claim 22 further comprises means for terminating initiation of the three-way conference call upon a receipt of a third message from the first station set.

24. The apparatus of claim 23 comprises means for transmitting the third message by the first station set in response to an action of a user of the first station set.

25. The apparatus of claim 23 wherein the initiating station set and the first station set are interconnected by a telecommunication switching system that is responsive to ISDN signaling and the means for establishing further comprises means for using user-user temporary signaling to establish the logical link via the telecommunication switching system.

26. The apparatus of claim 23 wherein the initiating station set and the first station set are interconnected by a telecommunication switching system that is responsive to ISDN signaling and the means for establishing further comprises means for using a logical link in a D channel to establish the logical link via the telecommunication switching system.

* * * * *